United States Patent [19]

Vowles

[11] 4,211,580
[45] Jul. 8, 1980

[54] METHOD AND APPARATUS FOR CLEANING AN ENDLESS STRIP OF FILM, TAPE, OR THE LIKE

[76] Inventor: Jaren P. Vowles, 445 E. 400 North, Centerville, Utah 84014

[21] Appl. No.: 3,268

[22] Filed: Jan. 15, 1979

[51] Int. Cl.² .............................................. B08B 1/02
[52] U.S. Cl. ....................................... 134/9; 15/21 B; 15/100; 134/122 P; 352/130; 360/137
[58] Field of Search ................... 134/9, 122 R, 122 P; 15/21 B, 100; 352/130; 360/137

[56] References Cited

U.S. PATENT DOCUMENTS

| | | | |
|---|---|---|---|
| 1,273,928 | 7/1918 | Rosenfeld | 134/9 |
| 1,927,284 | 9/1933 | Howell | 352/130 |
| 3,640,293 | 2/1972 | Freedman | 134/9 |
| 3,872,510 | 3/1975 | Childress, Jr. et al. | 134/9 X |
| 3,961,375 | 6/1976 | Mika et al. | 360/137 |
| 4,004,314 | 1/1977 | Post et al. | 360/137 X |

Primary Examiner—Richard V. Fisher
Attorney, Agent, or Firm—Criddle & Western

[57] ABSTRACT

Method and apparatus are disclosed for cleaning endless strips of motion picture film, magnetic tape, magnetic film, or the like contained in a reel formed on a rotatable hub housed in a casing, wherein cleaning is accomplished without opening the casing or removing the reel of film or magnetic tape therefrom. Successive portions of the film or tape stored in the reel are withdrawn as a continuous strip from the center of the reel. The strip is then continuously fed through an access opening in said casing to form a loop outside of the casing, wherein the strip is subjected to a cleaning means. The strip from the loop is introduced back through said opening to guide means within said casing. The guide means directs the strip of film or tape past an operational opening in the casing which is separate and apart from the access opening. The strip is then continuously returned to the reel. Means are provided in combination with the rotatable hub on which the reel is formed for continuously advancing the strip of film or tape in its movement from the reel, through the loop on the outside of the casing, back to the guide means within the casing, and then past the operational opening and back to the reel.

11 Claims, 8 Drawing Figures

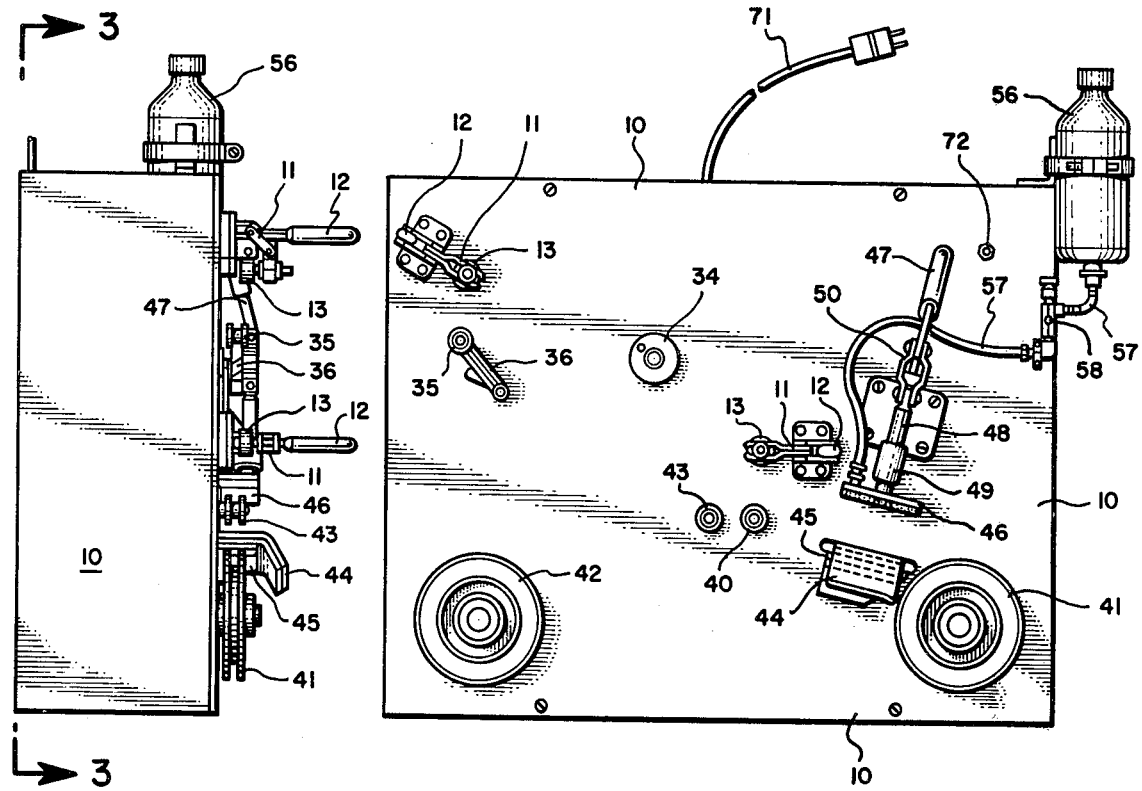
FIG. 2
FIG. 1
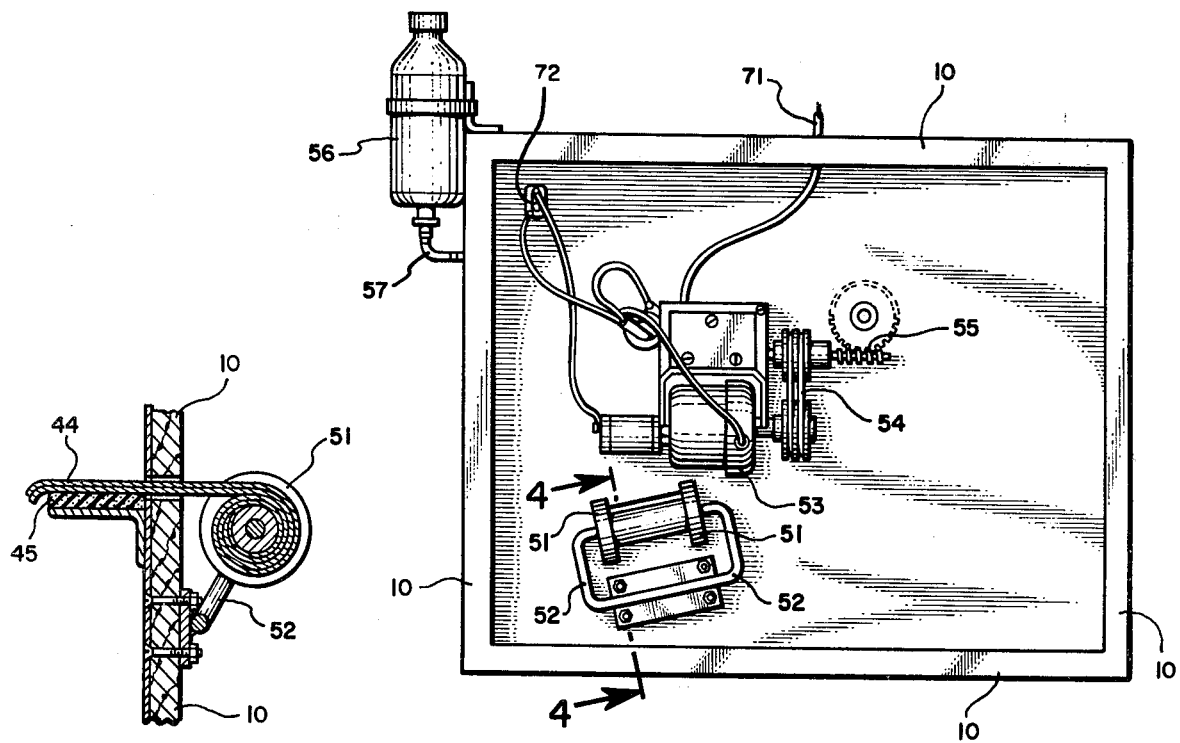
FIG. 4
FIG. 3

METHOD AND APPARATUS FOR CLEANING AN ENDLESS STRIP OF FILM, TAPE, OR THE LIKE

BACKGROUND OF THE INVENTION

1. Field

The invention pertains to methods and apparatus for cleaning and/or modifying data or format of continuous lengths of film or tape contained in a single reel and housed in a casing such as a cartridge or cassette.

2. State of the Art

In recent years motion picture films and magnetic tapes have become available in the form of a continuous, endless strip or length contained in a single reel housed in a casing such as a cartridge or cassette. In such single reel storage systems, a portion of the strip is withdrawn from the center of the reel and directed through guide means within the casing, past an operational opening in the casing and then returned to the outside of the reel. With motion picture film, the operational opening is used as a projection port wherein light can be passed through the film and directed to a viewing screen. With magnetic tapes, the access opening is used to bring the tape into contact with a magnetic tape head for recording or playing back of sound messages on the tape as well as adding or erasing data stored on the magnetic tape. Through ordinary use, the tape or film contained in such reels tends to become soiled and dusty. The problem is especially acute with respect to motion picture films wherein small pieces worn from the surface of the film itself, dust particles caught by static electric charges, and soil from the projection apparatus adhere to the film and ultimately affect the quality of the projected images from the film.

Generally, known film and tape cleaning techniques of the prior art are applicable to film or tape wound on conventional reels which are designed to be used in reel-to-reel type apparatus. The tape of film is cleaned as it is run from one reel to the other. Such cleaning techniques are not suitable for endless lengths of film or tape stored on a single reel contained in a housing or casing because the film or tape does not, in normal use, extend out of the housing or casing. In U.S. Pat. No. 3,640,293, issued on Feb. 8, 1972, to Myron L. Freedman, apparatus and method for cleaning film or tape stored on a single reel housed in a cartridge are proposed, wherein a loop of film or tape is drawn out of the cartridge through the normal operational opening therein (the projection port in motion picture cartridges). The withdrawn loop is threaded around guide rollers and between a pair of motor driven cleaning brushes which rotate against the film or tape as it passes between the brushes. The apparatus disclosed in U.S. Pat. No. 3,640,293 is rather bulky and awkward due to multiple drive mechanisms needed for driving the cleaning brushes and for advancing the film or tape through the cleaning brushes. Further, the cleaning must be done in a separate operation and cannot be done in the course of normal use of the film or tape inasmuch as the loop of film or tape is withdrawn from the operating opening in the cartridge.

Objectives

A principal objective of the present invention is to provide improved method and apparatus for cleaning or modifying endless strips of motion picture film, magnetic tape and film, or the like contained in a single reel and housed in a casing such as a cartridge or cassette. In particular, it is an object to provide for simple and inexpensive cleaning of such film or tape which does not utilize rotating brushes and which can be performed simultaneously with the normal use of the film or tape. Another objective is to provide a method for modifying data or format on endless strips of magnetic tape and film housed in a casing such as a cartridge or cassette.

SUMMARY OF THE INVENTION

The above objectives are achieved in accordance with the invention by providing a method and apparatus for cleaning endless lengths of film or tape contained in a single reel formed on a rotatable hub housed in a casing such as a cartridge or cassette. As used throughout the specification and claims, the term "cleaning" is meant to include removal of foreign matter on the film or tape as well as modifying and correcting data and format on magnetic tape and film. The film or tape is withdrawn from the center of the reel within the housing. The strip of film or tape is then fed through an access opening in the casing, the access opening being separate, apart, and removed from the normal operational opening in the casing. The strip is formed into a loop outside of the casing and then returned through the access opening to guide means in the casing. The guide means directs the strip of film past the operational opening in the casing and then back to the outside of the reel. As the strip of film or tape advances through the loop which is formed on the outside of the casing, it is subjected to cleaning and brushing means which remove extraneous dirt, lint, etc., from the film or tape. With respect to magnetic tape or film, the cleaning means may encompass one or more magnetic heads which is adapted to read and/or modify the data or format of the tape or film. Additional cleaning and brushing means may or may not be included with the magnetic heads for cleaning foreign matter from the film or tape in addition to the cleaning up or modifying and correcting of data and format of the magnetic film or tape by the magnetic head. Of course, if cleaning-up of the data or format of the film or tape is not desired, then the conventional cleaning and brushing means for removing foreign matter can be used without using the magnetic head.

Means are provided in combination with the rotatable hub on which the reel is formed for continuously advancing the strip from the center of the reel, through the loop and cleaning means on the outside of the casing, back to guide means within the casing, past the operational opening in the casing, and then return to the outside of the reel. In a preferred embodiment of the invention, the strip of film or tape has equally spaced drive perforations along at least one side thereof. A sprocket is provided in combination with the rotatable hub for advancing the film or tape. The sprocket is positioned adjacent to the reel and revolves with and about the same axis as the rotatable hub upon which the reel of film or tape is formed. The sprocket has cogs spaced therearound which are adapted to engage the perforations on the side of the strip of film or tape. The strip or tape is withdrawn from the center of the reel, directed through the access portion of the casing, about the loop on the outside of the casing, and back through the access opening. As the strip of film or tape returns to the casing through the access opening, it is guided over at least a portion of, but less than half of, the circumference of the sprocket so that the cogs in the sprocket engage the perforations along the side of the strip of film or tape. Thus, the rotation of the hub and sprocket pulls the strip of film from the center of the film through the loop on the outside of the casing to the sprocket. From the sprocket, the strip of film or tape is directed past the operational opening in the casing and then guided around a second portion of the sprocket to again engage the cogs of the sprocket in the perforations on the strip of film or tape. From its second engagement with the sprocket, the strip of film or tape is returned to the outside of the reel. Thus, the strip of film or tape is advanced from the center of the reel, through the loop on the outside of the casing past the operational opening in the casing and back to the outside of the reel by the rotation of the hub and sprocket. The hub and sprocket is driven by the drive means associated with the equipment in which the film or tape is being used, or by similar device means on a portable unit which is adapted to receive the casing. The double engagement of the sprocket by the strip of film or tape insures equal rates of withdrawing the strip from the center of the reel and of feeding the strip back to the outside of the reel.

As the strip of film or tape travels through the loop is formed outside of the casing, it is subjected to a brushing and cleaning operation. In those applications wherein foreign matter is to be removed from the film or tape, the strip passes through brushing and cleaning means comprising a pair of oppositely facing fabric elements. The fabric elements are of the type having soft pile or plush set in the fabric, with the pile or plush surfaces of the pair of elements facing each other for passage of the strip of film or tape therebetween. Means are provided for releasably biasing the fabric elements into contact with the respective side of the strip of film or tape. A liquid cleaning or washing solution can be applied to the strip of film prior to or concurrent with the passage of the strip through the brushing and cleaning means. Advantageously, the cleaning solution is applied continuously to the fabric elements of the brushing and cleaning means as the film or tape travels therebetween. In those applications involving magnetic tape film, the strip may, in addition to or in place of being passed through the fabric elements, be subjected to one or more magnetic heads adapted to read and/or modify the data or format of the tape of film, as mentioned hereinbefore.

The apparatus utilized in cleaning the endless strip of film or tape in accordance with the invention can be incorporated in combination with the equipment in which the film or tape is normally used, or it can be assembled as a self-contained, portable unit adapted to receive the casing containing the film or tape. In either situation, the apparatus comprises a support for positioning and holdng the casing, drive means for rotatably driving the hub and sprocket in the casing, guide means carried by the support for positioning and maintaining the portion of the strip of film or tape withdrawn from the access opening in the casing in a loop, and the cleaning and brushing means through which the strip of film or tape passes as it travels around the loop formed by the guide means. In those applications wherein cleaning elements are used to remove foreign matter from the film or tape, the apparatus preferably also includes means for applying a cleaning or washing solution to the film or tape prior to or concurrently with the passage of the film or tape through the cleaning and brushing means.

When the apparatus of this invention is combined with equipment in which the film or tape is normally used, such as projector when the film is motion picture film or memory storage device when the film or tape is magnetic, the means for supporting the casing of film or tape to the equipment and the means for rotatably driving the hub and sprocket of the casing in the normal course of use of such equipment are also employed for their same functions for purposes of the present invention. A distinct advantage in combining the apparatus of this invention with equipment in which the film or tape is normally used, is that continuous cleaning of the film or tape is accomplished simultaneously with the normal usage of the film or tape.

THE DRAWINGS

Preferred embodiments of the apparatus of this invention representing the best mode presently contemplated of carrying out the invention in actual practice are illustrated in the accompanying drawings, in which:

FIG. 1 is a front elevational view of one form of apparatus in accordance with the invention;

FIG. 2 is an end elevational view of the apparatus of FIG. 1;

FIG. 3 is a rear elevational view of the apparatus;

FIG. 4 is a cross-sectional view taken along line 4—4 of FIG. 3;

Figure 8:
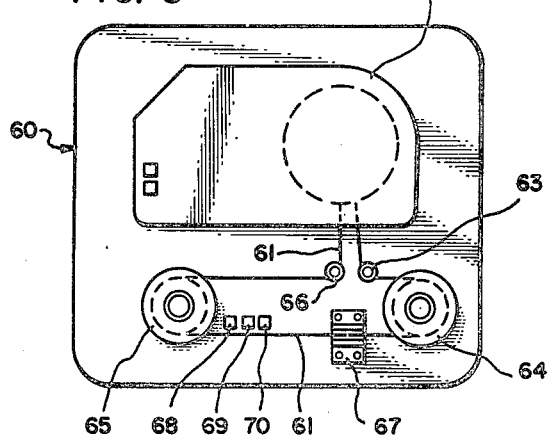
Figure 7:
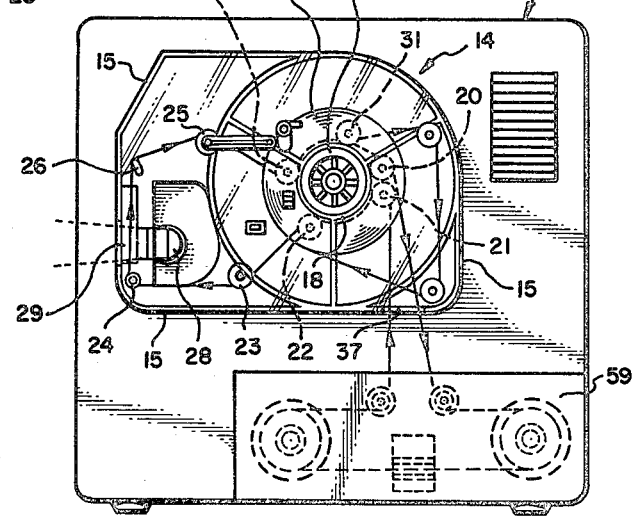

FIG. 7 is a front elevational view of a projector containing the cleaning unit of this invention built thereinto, so that the film in the cassette is continuously cleaned in the built-in cleaning unit simultaneously with the projection of the film by the projector; and FIG. 8 is a front elevational view of a tape head unit used in a memory storage device, with a cleaning unit in accordance with this invention built into the tape head unit.

DETAILED DESCRIPTION OF THE PREFERRED EMBODIMENTS

As illustrated in FIGS. 1-6 of the drawings, a preferred embodiment of the film-cleaning apparatus of this invention comprises a substantially rectangular, box-like housing 10 having a closed front face adapted for mounting thereupon of various other parts of the apparatus. The back face of the housing is left open for access to the parts contained within the housing 10.

Figure 5:
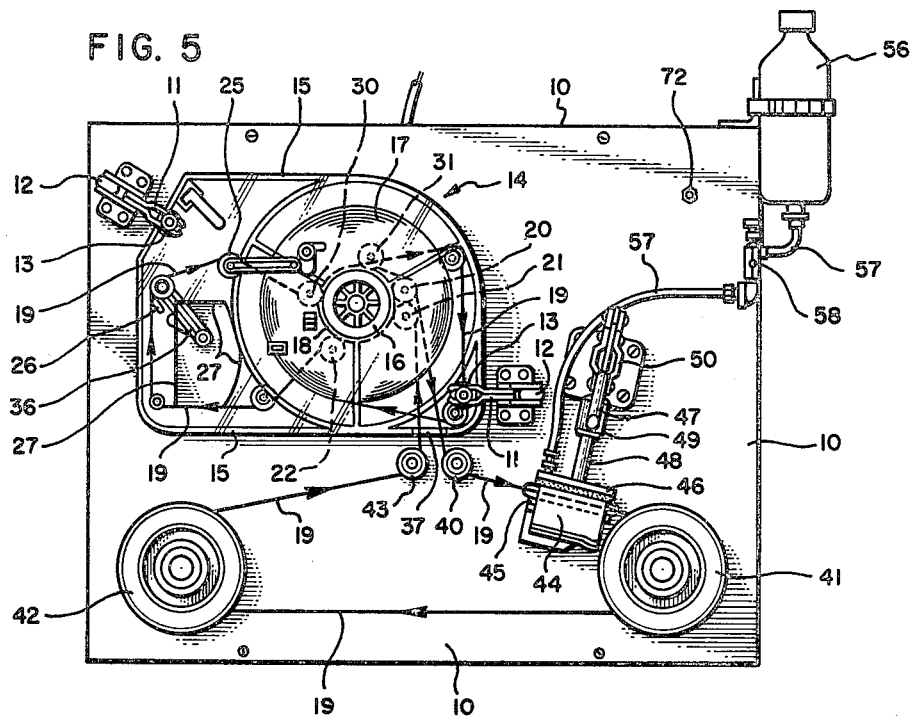
FIG. 5 is a front elevational view similar to that of FIG. 1 with a film cassette shown attached to the apparatus for cleaning the continuous strip of film contained in the cassette.

A pair of toggle-type clamps 11 are attached to the outer face of the front of the housing 10. The clamps have a handle portion 12 and a foot 13 which are interconnected so that as the handle 12 is rotated away from the clamp and toward housing 10, the foot 13 is lifted upwardly away from the housing 10, and as the handle is rotated back into a position extending substantially normal from the front of the housing 10, the foot 13 is moved directly towards the housing 10. Thus, as shown in FIG. 5, a cassette (shown generally by the reference numeral 14) containing an endless strip 15 of motion picture film, magnetic tape, magnetic film, or the like is readily mounted flatwise against the front of the housing 10 by securing the feet 13 of clamps 11 over the diagonally opposite corners of the cassette 14.

Figure 6:
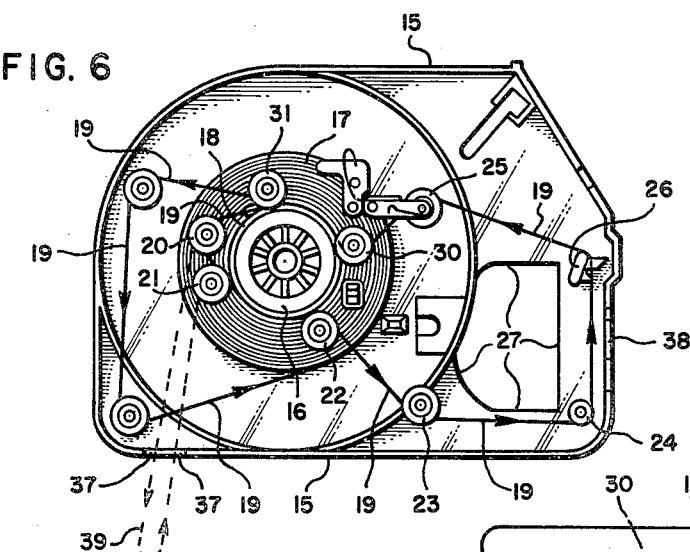
FIG. 6 is a back elevational view of the film cassette shown in FIG. 5, with the loop of film which is withdrawn from the reel being shown in dotted lines.

Although the apparatus of this invention can be adapted to clean continuous strips of film, tape, or the like of various types and sizes housed in cartridges or cassettes, it is particularly adapted to cleaning continuous motion picture film or magnetic tape or film housed in a cassette 14 as illustrated in the drawings. To assist in a full description of the apparatus and method of the invention, a discussion of the cassette as shown in the illustrated embodiment of the invention will be helpful. The cassette 14 comprises a casing 15 which can be made of essentially transparent plastic material. A front view of the cassette 14 is shown in FIG. 5 with the inner parts visible through the transparent front face of the cassette. A back view of the cassette 14 is shown in FIG. 6, with the back face of the cassette removed so as to show openings in the edges of the cassette 14. A hub 16 is rotatably mounted in the central portion of the cassette 14. A reel 17 of an endless film is formed on the rotatable hub 16. A sprocket 18 is provided in combination with the rotatable hub 16. The sprocket is positioned adjacent to one side of the reel 17 and revolves with and about the same axis as the rotatable hub 16. The strip 19 of film forming the reel 17 has equally spaced drive perforations along at least one side thereof, and the cogs in the sprocket 18 are adapted to engage the perforations on the side of the strip 19 of film.

In normal operation of the film cassette 14, the strip 19 of film is withdrawn from the center of reel 17, i.e., from the side of the reel 17 adjacent to the hub 16, and directed around a pair of pulleys 20 and 21 into contact with the cogs in the sprocket 18. Another pulley 22 is positioned so that the strip 19 of film is directed about a portion of but less than half of the circumference of the sprocket 18, so that the cogs in the sprocket 18 engage the perforations in the strip 19 of film as the strip passes about the sprocket 18. The engagement of the strip 19 of film by the sprocket between pulleys 21 and 22 produces a constant uniform withdrawal of film from the reel 17. From pulley 22, the strip 19 of film is directed around a set of pulleys 23, 24 and 25 and a guide 26 so that the film is forwarded in a loop past an aperture wherein, when the film is being projected on a projector, light passes from the rear of the film to project images from the film onto a screen in well known fashion, and when the film or tape is of the magnetic type, the tape of film passes over applicable magnetic read and write heads.

An opening 27 is provided in one side of the cassette 14 so that the projection lamp 28 and gate mechanism 29 (FIG. 7) of the projector or the magnetic heads of the magnetic tape device can be positioned within the cassette 14 during normal use of the film. From pulley 25, the strip 19 of film is threaded around another set of pulleys 30 and 31 which directs the strip 19 of film about a second portion of but less than half of the circumference of the sprocket 18, so that the cogs in the sprocket 18 again engage the perforations in the strip 19 of film as the strip passes over the sprocket 18. This second engagement of the strip 19 of film with the sprocket 18 insures uniform speed of advance of the strip 19 of film through the projection and gate mechanism 29 of the projector. In addition, the strip 19 of film is directed back to the outer side of the reel 17, and the second engagement of the strip 19 with the sprocket 18 insures that the strip 19 of film is withdrawn from the reel 17 and fed back to the reel 17 at identical rates. As shown, the strip 19 of film is directed from pulley 31 around a final set of pulleys 32 and 33 and then fed back to the outer side of the reel 17. When the cassette 14 is being used on a projector or magnetic tape device, the projector or other device has drive means which engages the hub 16 and drives it at a speed so that the strip 19 of film or tape is presented at the gating mechanism of the projector or the magnetic heads of the magnetic tape device at speed synchronized with the proper speed through the gating mechanism.

In one embodiment of the present invention, as illustrated in FIGS. 1-5, apparatus is provided for cleaning the film in an operation separate from the normal projection of the film. Using such apparatus, the cassette 14 of film would be removed from the projector and cleaned using the apparatus of this invention as shown in FIGS. 1-5. Following cleaning, the cassette 14 would then be available for further use in the normal projection.

As mentioned hereinbefore, the apparatus shown in FIG. 1-5 is provided with clamps 11 which hold the cassette 4 in secure position for the cleaning operation. Drive means are provided for driving the hub 16 of the cassette 14 when the cassette is in its cleaning position as shown in FIG. 5. The drive means comprises a cooperating drive wheel 34 (see FIG. 1) which is adapted to engage the hub 16 of the cassette 14 when the cassette 14 is secured to the apparatus. When cleaning the film on apparatus such as shown in FIGS. 1-5, it is advantageous to operate at a film speed several times faster than the speed during normal projection of the film. To accommodate the high film speed without harming the film, an idler roller or pulley 35 is provided on a spring biased arm 36. When the cassette 14 is positioned on the apparatus as shown in FIG. 5, the strip 19 of film is directed around pulley 35 so that the film clears the guide bar 26 of the cassette 14. The arm 36 is spring biased so that, as shown in FIG. 1, it can be rotated clockwise, with the spring urging the arm back in a counter-clockwise direction. The rotational movement of the arm 36 facilitates threading the strip 19 of film around pulley 35 when the cassette is positioned on the cleaning apparatus.

An access opening 37 (see FIG. 6) is provided in one of the side edges of the cassette 14. The access opening 37 is separate and apart from the normal light traversing aperture 38 used in projection of the images from the film onto a screen. In cleaning the film contained in the cassette 14, a loop 39 of the film (see FIG. 6) is withdrawn from the center of the reel and pulled out of the cassette 14 through the access opening 37 as shown in FIG. 6. Advantageously, the portion of the strip 19 of film passing between the pair of pulleys 20 and 21 is formed into the loop 39, with the strip 19 passing first over the pulley 20, through the loop 39, and then back over pulley 21. With the loop 39 of film extending from access opening 37, the cassette 14 is positioned on the cleaning apparatus as shown in FIG. 5.

The loop 39 of film is further withdrawn from the cassette 14 and positioned about a set of pulleys 40, 41, 42, and 43, respectively, to form an expanded loop of film outside the cassette 14. As the strip 19 of film is withdrawn from the center of reel 17, it passes over pulley 20 within the cassette, then through the access opening 37, successively around pulleys 40, 41, 42 and 43 to form the loop outside the cassette 14, and then back in the access opening and around pulley 21. The strip 19 of film passes through brushing and cleaning means as it advances through the loop on the outside of the cassette 14.

As best illustrated in FIGS. 1, 3, and 5, the cleaning and brushing means preferably comprises a pair of fabric brushing and cleaning elements 44, with the pile or plush surfaces of the cleaning elements 44 facing each other for passage of the strip 19 of film therebetween. Means are also advantageously provided for biasing the cleaning elements 44 into contact with the respective sides of the strip 19 of film as the film passes between the cleaning elements 44. The biasing means conveniently comprises a pair of oppositely facing platens 45 and 46, respectively. As illustrated, one of the platens 45 is mounted firmly to the housing 10 (see FIG. 4). The other platen 46 is mounted on the apparatus by a toggle mechanism capable of moving the platen 46 toward and away from the first platen 45. As best seen in FIGS. 1 and 5 the toggle mechanism comprises a lever-type handle 47 which is linked by a toggle linkage 50 to one end of a piston 48. The piston 48 is adapted for longitudinal, reciprocal movement through a guide bearing 49. The platen 46 is attached to the other end of the piston 48. As handle 47 is rotated to a position extending generally toward the piston 48, the piston 48 moves so that the platen 46 moves face to face towards the platen 45. Reversing the movement of the handle 47 results in withdrawing platen 46 away from platen 45.

The fabric brushing and cleaning elements 44 are positioned between the two platens 45 and 46. As the film or tape which is to be cleaned is withdrawn from the cassette 14 and passed around pulleys 40, 41, 42, and 43, it is also made to pass between the fabric brushing and cleaning elements 44. Platen 46 is then moved toward platen 45 so as to press the fabric brushing and cleaning elements 44 firmly into contact with the opposite sides of the strip of film or tape 19. In a prefered embodiment, the brushing and cleaning elements 44 comprise a pair of elongate strips of fabric material, and means are provided for storing a supply of the fabric material, so that the portion of the fabric material positioned between the platens 45 and 46 can be repeatedly replaced with clean fabric material as needed by withdrawing fabric material from the storage means. As illustrated in FIGS. 3 and 4, the means for storing the supply of fabric comprises a spool 51 upon the elongate strips of fabric material are wound. The spool 51 is advantageously mounted on the inside of the front face of the cleaning apparatus using any convenient mounting mechanism such as the c-clamp mechanism 52 shown in FIG. 3. A slot is formed in the front face of the apparatus through which the strips of fabric material passes to its position between the platens 45 and 46. As the portion of the fabric material between platens 45 and 46 becomes dirty, a fresh supply can be unwound from the spool 51.

As shown in FIG. 3, a motor drive 53 is provided and conveniently mounted on the inside of the front face of the apparatus. The motor drive 53 is connected to the drive wheel 34 by appropriate gearing and drive mechanisms, such as the drive belts and worm gears shown in FIG. 3.

Means can also be provided by applying a cleaning solution to the strip 19 of film prior to or concurrently with the passage of the strip 19 of film through the cleaning and brushing means. As shown in FIGS. 1, 2, 4, and 5, a supply of cleaning solution is stored in a container 56, such as a bottle, which is mounted on the apparatus. The container 56 has tubing 57 connected to the underside thereof, and the tubing runs to the platen 46. A valve 58 is provided in the tubing 57 so that flow of cleaning fluid through the tubing can be controlled. In the illustrated embodiment, the cleaning fluid is fed to platen 46 so that the fluid will wet the cleaning elements 44 which are positioned between platens 45 and 46.

Electrical power is supplied to the motor 53 by electrical line 56 which is adapted to be plugged into a conventional outlet. The electrical hookup to the motor 53 preferably includes a switch 57 (FIGS. 1 and 3) so that the apparatus can be turned on and off without disconnecting the electrical line 56 from its source of electrical potential.

As mentioned previously, the cleaning apparatus of this invention can be advantageously incorporated with conventional projection equipment. As shown in FIG. 7, the cassette 14 is mounted in its operative position on a projector 58. The projector has been modified so as to include a cleaning unit 59 in accordance with the present invention. The cleaning unit 59 comprises a pulley system shown by dotted lines in FIG. 7. Film is withdrawn from the cassette as explained hereinabove and formed into a loop around the pulley system. Brushing and cleaning means are provided for cleaning the film as it passes through the loop around the pulley system. The motor drive of the projector 58 drives the film in a continuous loop about the pulley system of the cleaning unit 59 during the otherwise normal operation of the projector 58. Thus, the film is continuously cleaned as it is projected.

The apparatus of this invention can also be used to clean magnetic tape used in computer, video, and sound applications. A tape cleaning unit 60 is shown in FIG. 8, for cleaning tapes used in a computer system or other magnetic tape application. The magnetic tape 61 is withdrawn from the cassette 62 in the same manner as described hereinabove with respect to the film cassette 14. The tape is formed into a loop around a set of pulleys 63, 64, 65, and 66, which are provided in combination with the tape head unit. These pulleys are identical in function to the pulleys 40, 41, 42, and 43, respectively shown in FIGS. 1, 3, and 5. A motor and drive similar to motor 53, belt 54, and worm drive 55 shown in FIG. 3 drives the tape in a continuous loop around the pulley system. Cleaning means 67 are provided for cleaning the tape as it passes through the loop around the pulleys. The cleaning means 67 is the same as previously described with respect to the embodiment of the invention shown in FIGS. 1-7.

Advantageously, a set of read, write, and erase heads 68, 69, 70 are provided to make operable contact with the tape as it passes through the loop around the pulleys 63, 64, 65, and 66. Thus, while the tape is being cleaned, it can also be modified, erased, or additional data added thereto. The tape cleaning apparatus can be incorporated right in the normal tape head unit in a like manner as described previously with respect to the film cleaning apparatus being incorporated into a standard projection unit. When the tape cleaning apparatus is incorporated into a conventional tape head unit, it is still advantageous to include the set of heads 68, 69, and 70 in addition to the normal heads on the tape head unit.

Whereas this invention has been illustrated and described with reference to particular embodiments thereof, it is to be understood that other embodiments and various modifications can be achieved in accordance with the teachings hereof without departing from the subject matter coming within the scope of the accompanying claims, which subject matter is regarded as the invention.

I claim:

1. A method for cleaning an endless strip of motion picture film, magnetic tape, magnetic film, or the like contained in a reel formed on a rotatable hub housed in a casing, wherein the strip is withdrawn from the center of the reel, directed through guide means within said casing past an operational opening in said casing and is then returned to the ouside of the reel, said method comprising withdrawing the strip from the center of the reel, feeding the strip through an access opening in said casing, said access opening being separate and apart from said operational opening in said casing; forming the strip into a loop outside of said casing; passing the strip in said loop through brushing and cleaning means; feeding the strip from said loop back into said casing through said access opening; returning the strip to the guide means in said casing to be directed past said operational opening and back to the outside of the reel; and continuously advancing successive portions of the endless strip from the center of the reel through said access opening to said brushing and cleaning means back through said access opening, past said operational opening, and then returned to the outside of said reel.

2. A method in accordance with claim 1, wherein the strip is subjected to a washing solution prior to or concurrent with the passage of the strip through the brushing and cleaning means.

3. A method in accordance with claim 1, wherein the brushing and cleaning means comprise a pair of fabric brushing and cleaning elements of pile or plush set in the fabric, with the pile or plush surfaces of the elements facing each other for passage of said strip therebetween and means for releasably biasing said elements into contact with the respective sides of said strip.

4. A method in accordance with claim 3, wherein means are provided for wetting the brushing and cleaning elements with a cleaning solution.

5. A method in accordance with claim 1, wherein the hub upon which the reel is formed includes a sprocket positioned adjacent to the reel, said sprocket being adapted to revolve with the hub and about the same axis as the hub, said endless strip is directed around at least a portion of said sprocket and has equally spaced, drive perforations along at least one side thereof, said sprocket has drive cogs spaced thereon which are adapted to engage the perforations on the side of said strip, and said successive portions of said strip of film or tape is advanced on its travel from the center of said reel to the outside of said reel by drive means which rotate the hub and sprocket.

6. Apparatus for cleaning an endless strip of motion picture film, magnetic tape, magnetic film, or the like contained in a reel formed in a cassette comprising a rotatable hub housed in a casing, wherein said strip is adapted to be withdrawn from the center of the reel, directed through guide means within said casing past an operational opening in said casing and is then returned to the outside of the reel; an access opening in said casing separate and apart from said operational opening in said casing whereby said strip is also adapted to be withdrawn from said casing as a loop and returned thereinto through said access opening in said casing when the strip is to be cleaned, said apparatus comprising in combination with said cassette a support for positioning and holding said casing; drive means for rotatably driving said hub; guide means carried by said support for positioning and maintaining the portion of the strip withdrawn from said casing in a loop; means carried by said support for cleaning said strip including oppositely opposed cleaning pads between which said strip passes as it moves through said loop; and means for resiliently forcing said cleaning pads into contact with the mutually opposite sides, respectively, of said strip as the strip passes between said cleaning 7. Apparatus in accordance with claim 6 which further includes means for applying a cleaning solution to said strip prior to or concurrently with the passage of said strip through said cleaning pads.

8. Apparatus in accordance with claim 6, wherein the oppositely opposed cleaning pads comprise respective fabric elements having pile or plush set in the fabric, with the pile or plush surfaces facing each other for passage of said strip therebetween.

9. Apparatus in accordance with claim 8, wherein the means for resiliently forcing the pile or plush surfaces of the cleaning pads into contact with the mutually opposite sides, respectively, of the strip comprises a pair of oppositely faced, spaced platens, with the cleaning pads positioned within the space therebetween; and means for moving the platens face-to-face toward each other.

10. Apparatus in accordance with claim 9, wherein the cleaning pads comprise a pair of elongate strips of fabric material; and means are provided for storing a supply of such fabric material, so that the portion of the fabric material positioned between the platens can be repeatedly replaced with clean fabric material as needed by withdrawing fabric material from the storage means.

11. Apparatus in accordance with claim 10, wherein the means for storing the supply of fabric material comprises a spool upon which the fabric material is wound.

* * * * *